US010498888B1

(12) United States Patent
Rute et al.

(10) Patent No.: US 10,498,888 B1
(45) Date of Patent: Dec. 3, 2019

(54) AUTOMATIC CALL CLASSIFICATION USING MACHINE LEARNING

(71) Applicant: Upcall Inc., San Francisco, CA (US)

(72) Inventors: Jason Rute, Cambridge, MA (US); Michael Devyver, Palo Alto, CA (US)

(73) Assignee: Upcall Inc., San Francisco, CA (US)

( * ) Notice: Subject to any disclaimer, the term of this patent is extended or adjusted under 35 U.S.C. 154(b) by 0 days.

(21) Appl. No.: 16/366,605

(22) Filed: Mar. 27, 2019

Related U.S. Application Data

(60) Provisional application No. 62/678,189, filed on May 30, 2018.

(51) Int. Cl.
| | | |
|---|---|---|
| *H04M 1/00* | (2006.01) | |
| *H04M 3/436* | (2006.01) | |
| *G10L 15/02* | (2006.01) | |
| *G06N 3/08* | (2006.01) | |
| *H04M 3/533* | (2006.01) | |
| *G06N 7/00* | (2006.01) | |
| *G10L 15/06* | (2013.01) | |

(52) U.S. Cl.
CPC .............. *H04M 3/436* (2013.01); *G06N 3/08* (2013.01); *G06N 7/005* (2013.01); *G10L 15/02* (2013.01); *G10L 15/063* (2013.01); *H04M 3/53366* (2013.01)

(58) Field of Classification Search
CPC ........... H04M 2201/40; H04M 3/5175; H04M 3/42221; H04M 2203/556; H04M 3/5232; H04M 3/4936; H04M 3/51; H04M 3/2281; H04M 3/5183; H04M 2203/305; H04M 2203/403; H04M 3/493; H04M 3/5166; H04M 2203/2038; H04M 3/22; G06N 20/00; G06N 7/005; G06N 5/02; G06N 5/04; G06F 17/2785
See application file for complete search history.

(56) References Cited

U.S. PATENT DOCUMENTS

| | | | |
|---|---|---|---|
| 2004/0158558 A1* | 8/2004 | Koizumi | ............... G06F 16/353 |
| 2015/0120379 A1* | 4/2015 | Lee | ........................ G06Q 30/02 |
| | | | 705/7.29 |
| 2017/0187880 A1* | 6/2017 | Raanani | ............... H04M 3/5232 |

* cited by examiner

*Primary Examiner* — Quan M Hua
(74) *Attorney, Agent, or Firm* — Cognition IP, P.C.; Bryant Lee

(57) ABSTRACT

A system may obtain audio files of phone calls and predict the outcomes of the phone calls using a machine learning model. The system may translate the audio files to text transcripts and convert the text transcripts into vectors. The vectors may be input into a machine learning model trained on prior examples of phone calls and their true outcomes. The machine learning model may output a predicted classification of the outcome of the phone call.

20 Claims, 3 Drawing Sheets

US 10,498,888 B1

AUTOMATIC CALL CLASSIFICATION USING MACHINE LEARNING

CROSS-REFERENCE TO RELATED APPLICATIONS

This application claims the benefit of U.S. Provisional Patent Application No. 62/678,189, filed May 30, 2018, which is hereby incorporated by reference in its entirety.

FIELD OF THE INVENTION

The present invention relates to software and hardware for classifying a phone call.

BACKGROUND

It is often necessary for operators in call centers to classify the outcome of a phone call. Current methods include displaying a user interface to the operator so that the operator may select an outcome or enter an outcome in a free text field. Recording the outcome of the phone call is important for knowing what further actions to take regarding the recipient of the phone call, for example whether to follow up with the individual or to take the individual off a calling list.

However, requiring operators to manually enter the outcome of a phone call is cumbersome. It distracts operators from their task and takes precious seconds away from time they could be spending making more calls. Moreover, operators can select the wrong outcome choices when under the time pressure to select outcomes quickly, leading to inaccurate data. Therefore, it would be advantageous to use a computer system to analyze phone calls and automatically determine the outcome.

SUMMARY OF THE INVENTION

Embodiments relate to using a machine learning system to automatically classify the outcome of a phone call. The system may be used, for example, in call centers where human operators would otherwise have to record the outcomes themselves.

One embodiment relates to a machine learning method for classifying the outcome of a phone call. A text transcript of a phone call is provided and is translated into a vector representation. The vector representation is input to a machine learning model, which outputs a predicted classification of the outcome of the phone call. Optionally, the predicted classification of the outcome may be used to determine future actions of the system.

DETAILED DESCRIPTION

Figure 1:
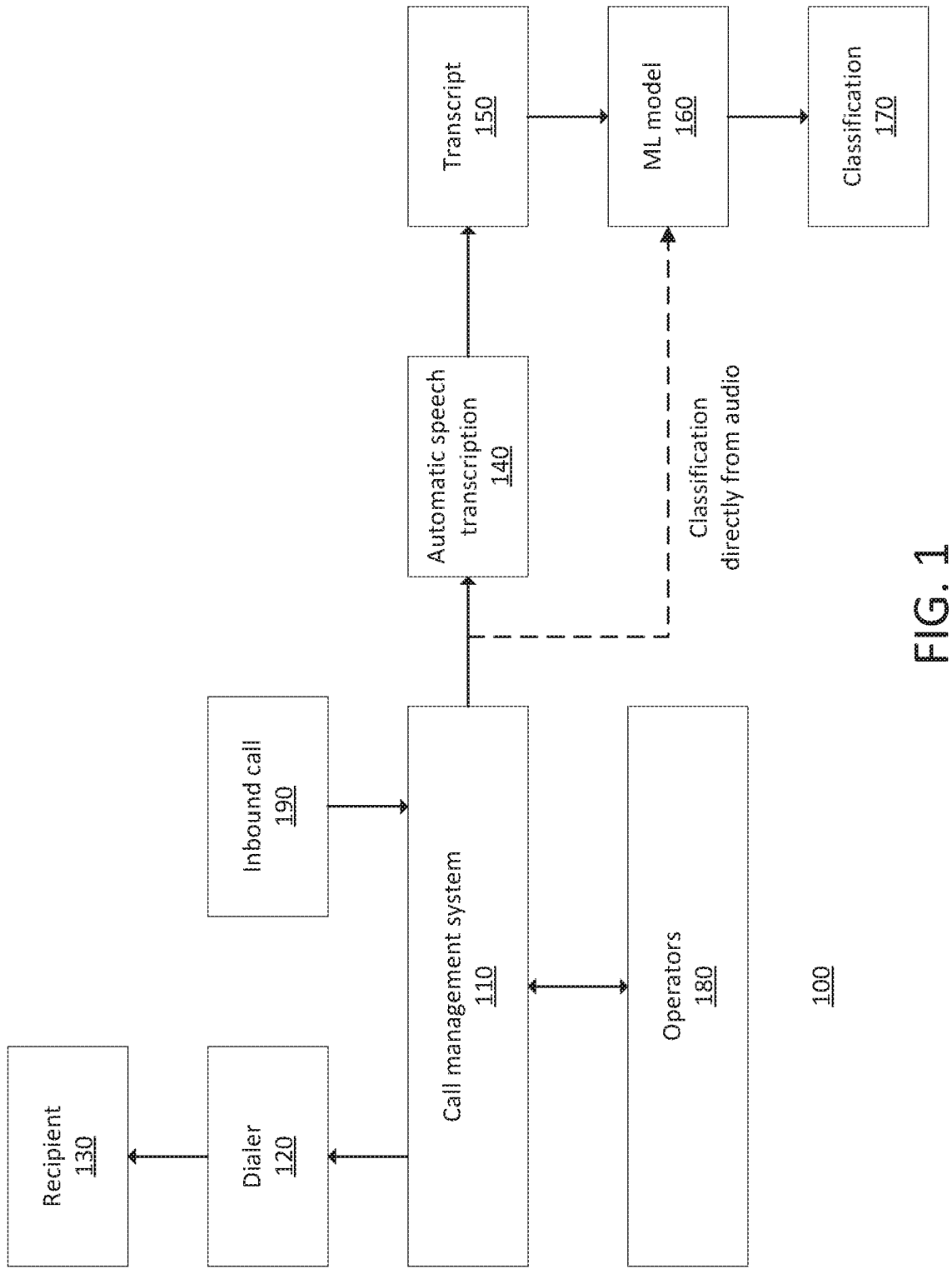
FIG. 1 illustrates an exemplary environment in which a call management system with a call outcome classifier may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

FIG. 1 illustrates an exemplary environment 100 in which embodiments may operate. A call management system 110 manages calls for human operators 180. The human operators 180 may be in a dedicated call center for a business. The call management system 110 provides functionality such as automatically setting up and connecting calls. When a human operator completes a call, the call management system 110 may automatically initiate the next call.

Some embodiments operate to classify outbound calls. For outbound calling, the call management system 110 automatically determines a phone number to dial. The call management system 110 may do this by iterating through a list of phone numbers and scheduling phone numbers to dial based on several factors such as the last time an operator called that number, whether the number is considered to be a good number, the last contact that number had with the business, and so on. The call management system may transmit a request to call a phone number to a dialer 120 that dials the phone number. After the receiving phone rings and is picked up, the call is then connected with the recipient 130. Alternatively, the call goes to a voicemail box if the recipient 130 is not available.

Some embodiments may instead operate on inbound calls to a call center. In that case, inbound calls 190 are received by call management system 110 and routed by the call management system 110 to an available operator 180 who may answer the call and speak with the inbound caller.

Inbound and outbound calls may connected over various networks such as the public switched telephone network (PSTN), voice over IP (VOIP), the Internet, intranets, or other networks.

Classification may be performed by first translating phone calls into the intermediate representation of text. Automatic speech transcription system 140 may take as input an audio file of a phone call and output a text file transcript 150 representing the words spoken. The text transcript 150 may optionally also include indications of the turns taken (the switch between party speaking) and the identity of the party speaking for each utterance, whether it be the operator or caller or callee.

The text transcript 150 may be entered as input into machine learning model 160 that serves to classify the outcome of the phone call. The outcome of a phone call may also be referred to as a disposition or status. Outcomes may include voicemail, call back later, not interested, completed, wrong number, maybe interested, alternative phone, and other possible outcomes. The voicemail outcome means that the recipient of the call was not available and the call went to voicemail. The call back later outcome means that the recipient was available but that it is necessary to call back later. The not interested outcome means that the recipient was reached but was not interested. The completed outcome means that the recipient was reached and the transaction was completed. The wrong number outcome means that a wrong number was reached. The maybe interested outcome means that the recipient was reached and might be interested. The alternative phone outcome means that an alternative phone number for the recipient was received and entered.

Machine learning model 160 may employ a variety of machine learning models such as any of deep learning, neural networks, multinomial logistic regression, decision trees, random forests, Bayesian networks, support vector machines, nearest neighbor, ensemble methods, and other machine learning models.

Although one method was described involving the transformation of an audio file into text before classification, alternative embodiments may involve the direct classification of the outcome of the phone call from the audio file by the machine learning model 160 without going through the intermediate stage of a text representation.

Figure 2:
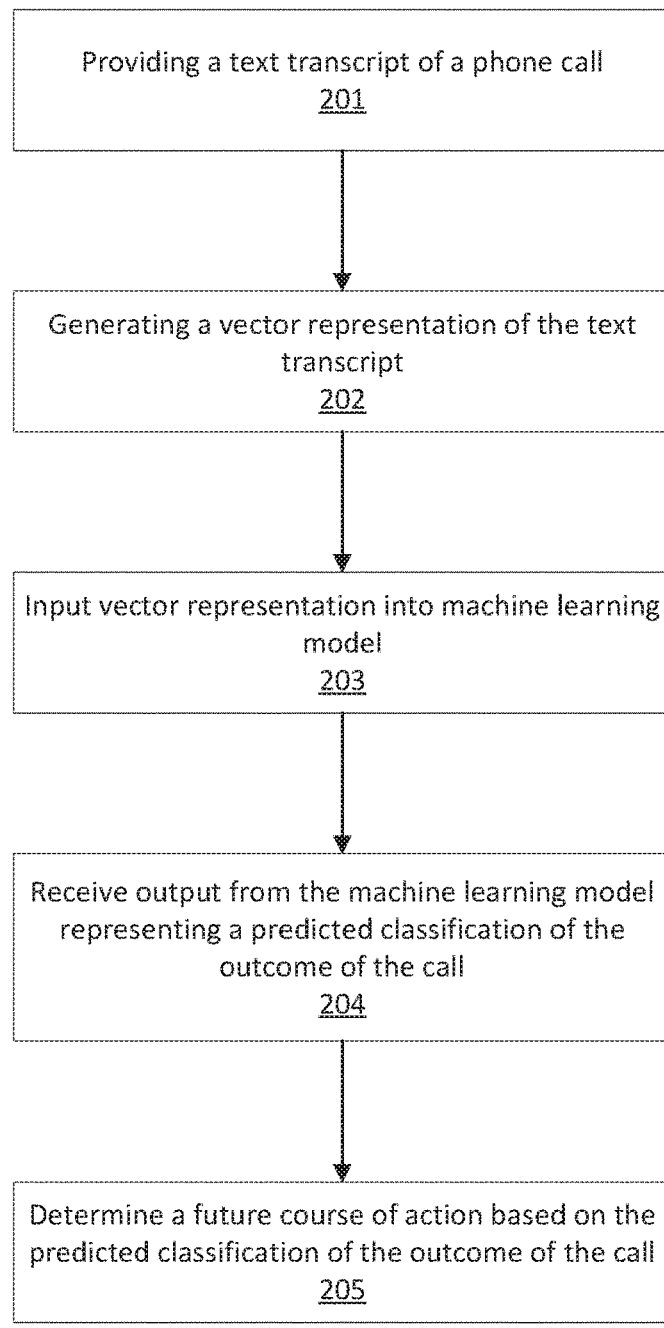
FIG. 2 illustrates an exemplary method for classifying the outcome of a call using machine learning.

FIG. 2 illustrates an exemplary method 200 that may be performed to classify a phone conversation. In step 201, a text transcript is provided of a phone call. An automatic speech recognition system may be used to generate the text transcript. In step 202, a vector representation of the text transcript is generated. Embodiments may use a variety of vector representations. The vectors may be referred to as feature vectors.

In one embodiment, a vector is generated using a bag of words model. Each element of the vector represents the frequency of a particular word or n-gram in the text. In a raw frequency based model, each vector element is simply the number of times that each word or n-gram appears in the text. An n-gram is an adjacent grouping of n words or characters. Therefore, 1-grams represent single words and 2-grams represent pairs of adjacent words. Values of n larger than 2 may also be used. N-grams are typically ordered but may optionally be unordered.

In more sophisticated methods, the elements may instead be represented by term frequency-inverse document frequency (TF-IDF) of n-grams rather than raw counts. Term frequency-inverse document frequency normalizes frequencies to provide more information than a raw count. The TF-IDF is calculated by multiplying the term frequency by the inverse document frequency. The term frequency of a term in a document is obtained by taking the number of times the term appears in the document divided by the number of words in the document. The inverse document frequency is obtained by dividing the total number of documents in the set (e.g., the number of text transcripts of calls) by the number of documents containing the term and taking the natural log of the resulting value. The TF-IDF can be represented by the equation $$\frac{f_{t,d}}{\Sigma f_{t',d}} \ln \frac{N}{n_t}$$

where $f_{t,d}$ is the frequency of the term t in document d, $\Sigma f_{t',d}$ is the number of words in document d, N is the number of documents in the set, and $n_t$ is the number of documents containing the term t.

In another embodiment, a vector may be generated to represent the text as a document embedding. An embedding is a vector representation of an entity that tends to place more closely related entities to be more closely located in vector space and tends to place more disparate entities farther from each other in vector space. In the case of text transcripts of phone calls, the goal of an embedding would be to group similar text transcripts closely together in vector space. One method of generating an embedding is using the skip-gram model. In the skip-gram model, a one layer neural network is used and the weights learned by the single layer of the neural network end up being the vector representation for the embedding of the text.

In one embodiment, a single layer neural network is trained using one-hot vector encodings of words to output probabilities that other words appear in the same context as the given word, where a context is a word window of a specified size. One-hot vector encodings have an element for each possible word, where there is a single 1 in the position of the represented word and a 0 in all other positions. The output layer of the single layer neural network has a node for each potential word in the vocabulary, and the value of each node in the output layer is the probability that the word appears in the context of the input word. After training the single layer neural network, the weights of the single layer neural network for a particular word, when input as a one-hot encoding, may be used as a word embedding for the word. The word embeddings created in this manner tend to cluster similar words together in vector space, while increasing the distance to unlike words.

The skip-gram model may also be applied to documents in the same manner by training a single layer neural network to output probabilities that other documents are similar to the input document, which is input as a one-hot vector encoding. In this way, document embeddings may be generated, similarly to word embeddings.

In step 203, the vector representation is input into a machine learning model. The machine learning model is previously trained using supervised learning by providing examples of pairs of text transcripts of phone calls and correct classifications of the outcome of the call. Through the training process the machine learning model learns an internal representation with increased accuracy in classifying new, unseen examples into the various outcomes.

In step 204, an output is received from the machine learning model representing a predicted classification of the outcome of the phone call.

In step 205, optionally, the system may determine a future course of action to take based on the predicted classification of the outcome of the phone call. The course of action may include determining whether to schedule a follow up phone call. If it is determined that a follow up phone call should be scheduled, then the system may schedule a follow up phone call using the call management system 110 or other schedule management system.

Figure 3:
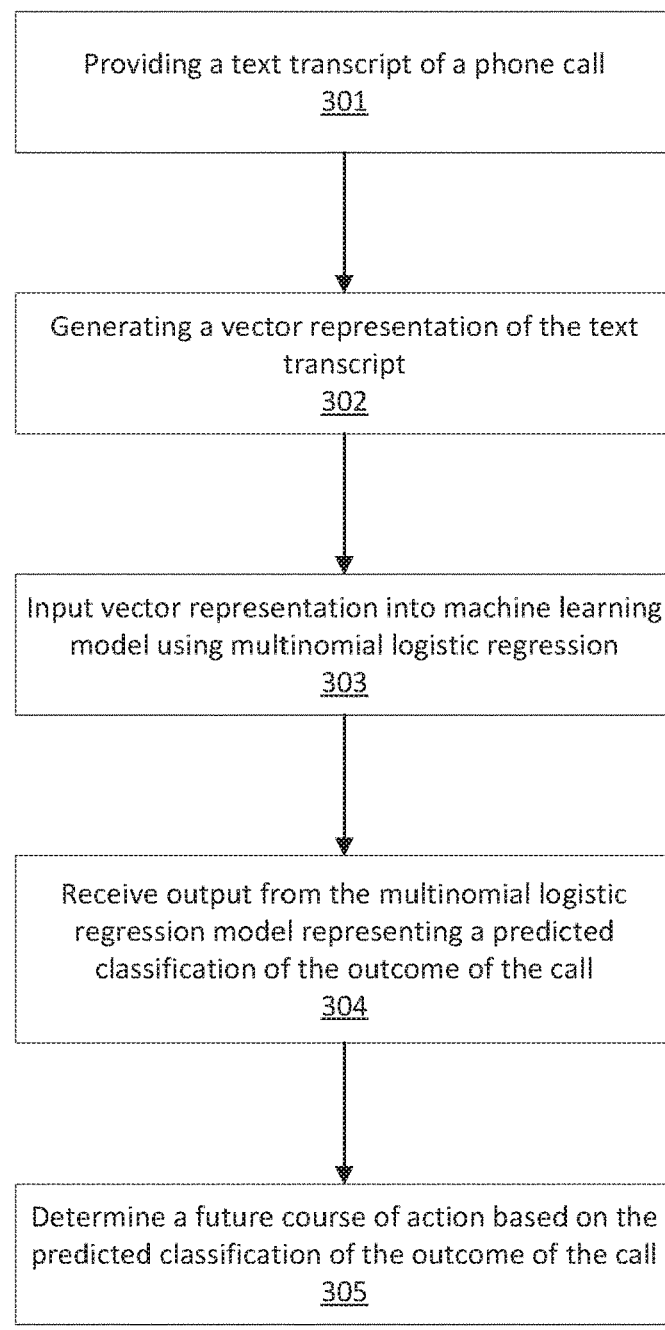
FIG. 3 illustrates another exemplary method for classifying the outcome of a call using machine learning.

FIG. 3 illustrates an exemplary method 300 that may be performed to classify a phone conversation. In step 301, a text transcript is provided of a phone call. An automatic speech recognition system may be used to generate the text transcript. In step 302, a vector representation of the text transcript is generated. Embodiments may use a variety of vector representations, including bag of words or document embedding as described above.

In one embodiment, the vector representation includes at least some elements representing the TF-IDF of 1-grams of single words in the text transcript and at least some elements representing the TF-IDF of 2-grams of adjacent word pairs in the text transcript. Such a vector representation may optionally be created by setting a maximum vector size (e.g., 10,000), determining from the set of text transcripts of phone calls the most common 1-grams and 2-grams up to the maximum vector size (e.g., the 10,000 most common 1-grams and 2-grams), and generating the vector representation of the text transcript by filling the vector with elements representing the TF-IDF of the most common 1-grams and 2-grams in the set of text transcripts up to the maximum vector size.

In step 303, the vector representation is input into a machine learning model. The machine learning model may be a multinomial logistic regression model. Optionally, the multinomial logistic regression model may use the Softmax function to categorize outcomes into multiple classes. When the Softmax function is used, this is known as Softmax regression or the Softmax algorithm. The model may also use L2 regularization to help prevent overfitting. L2 regularization may also be referred to as Ridge regression and adds squared magnitude of coefficients as a penalty term to the loss function. Alternatively, L1 regularization may be used in the model. L1 regularization may also be referred to as Lasso regression and adds absolute value of magnitude of coefficients as a penalty term to the loss function.

The multinomial logistic regression model is trained using examples of text transcripts, in vector representation format as described above, along with their correct outcome classifications. The vector representations used for training may, for example, include at least some elements representing the TF-IDF of 1-grams of single words in the text transcripts and at least some elements representing the TF-IDF of 2-grams of adjacent word pairs in the text transcripts. Through training, the multinomial logistic regression model then converges to a model that allows classification of unseen examples.

In step 304, an output is received from the multinomial logistic regression model representing a predicted classification of the outcome of the phone call.

In step 305, optionally, the system may determine a future course of action to take based on the predicted classification of the outcome of the phone call. The course of action may include determining whether to schedule a follow up phone call. If it is determined that a follow up phone call should be scheduled, then the system may schedule a follow up phone call using the call management system 110 or other schedule management system.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed:

1. A method for automatically classifying the outcome of a phone call, the method performed by a computer system, the method comprising:
   providing a text transcript of a phone call;
   generating a vector representation of the text transcript,
   the vector representation including at least some elements representing the term frequency-inverse document frequency (TF-IDF) of 1-grams of single words in the text transcript and at least some elements representing the TF-IDF of 2-grams of adjacent word pairs in the text transcript;
   inputting the vector representation into a multinomial logistic regression model,
   the multinomial logistic regression model trained on vector representations of text transcripts of phone conversations, the vector representations including at least some elements representing the TF-IDF of 1-grams of single words in the text transcripts and at least some elements representing the TF-IDF of 2-grams of adjacent word pairs in the text transcripts;
   receiving an output from the multinomial logistic regression model representing a predicted classification of the outcome of the phone call.

2. The method of claim 1, wherein the multinomial logistic regression model uses the Softmax function.

3. The method of claim 1, wherein the multinomial logistic regression model uses L2 regularization.

4. The method of claim 1, wherein the predicted classification of the outcome of the phone call is one of voicemail, call back later, not interested, completed, wrong number, maybe interested, or alternative phone.

5. The method of claim 1, further comprising:
   setting a maximum vector size;
   determining from a set of text transcripts the most common 1-grams and 2-grams of words up to the maximum vector size;
   generating the vector representation of the text transcript by filling it with elements representing the TF-IDF of the most common 1-grams and 2-grams of words from the set of text transcripts up to the maximum vector size.

6. The method of claim 1, further comprising:
   generating the text transcript of the phone call using automatic speech recognition.

7. The method of claim 1, wherein the phone call is an inbound phone call.

8. The method of claim 1, wherein the phone call is an outbound phone call.

9. The method of claim 1, further comprising determining a future course of action based on the predicted classification of the outcome of the phone call.

10. The method of claim 1, further comprising determining whether to schedule a follow up phone call based on the outcome of the predicted classification of the outcome of the phone call; and
    scheduling a follow up phone call using a scheduling management system.

11. A non-transitory computer-readable medium comprising instructions for automatically classifying the outcome of a phone call, the instructions for execution by a computer system, the non-transitory computer-readable medium comprising instructions for:

provide a text transcript of a phone call;

generating a vector representation of the text transcript, the vector representation including at least some elements representing the term frequency-inverse document frequency (TF-IDF) of 1-grams of single words in the text transcript and at least some elements representing the TF-IDF of 2-grams of adjacent word pairs in the text transcript;

inputting the vector representation into a multinomial logistic regression model, the multinomial logistic regression model trained on vector representations of text transcripts of phone conversations, the vector representations including at least some elements representing the TF-IDF of 1-grams of single words in the text transcripts and at least some elements representing the TF-IDF of 2-grams of adjacent word pairs in the text transcripts;

receiving an output from the multinomial logistic regression model representing a predicted classification of the outcome of the phone call.

12. The non-transitory computer-readable medium of claim 11, wherein the multinomial logistic regression model uses the Softmax function.

13. The non-transitory computer-readable medium of claim 11, wherein the multinomial logistic regression model uses L2 regularization.

14. The non-transitory computer-readable medium of claim 11, wherein the predicted classification of the outcome of the phone call is one of voicemail, call back later, not interested, completed, wrong number, maybe interested, or alternative phone.

15. The non-transitory computer-readable medium of claim 11, further comprising instructions for:

setting a maximum vector size;

determining from a set of text transcripts the most common 1-grams and 2-grams of words up to the maximum vector size;

generating the vector representation of the text transcript by filling it with elements representing the TF-IDF of the most common 1-grams and 2-grams of words from the set of text transcripts up to the maximum vector size.

16. The non-transitory computer-readable medium of claim 11, further comprising instructions for:

generating the text transcript of the phone call using automatic speech recognition.

17. The non-transitory computer-readable medium of claim 11, wherein the phone call is an inbound phone call.

18. The non-transitory computer-readable medium of claim 11, wherein the phone call is an outbound phone call.

19. The non-transitory computer-readable medium of claim 11, further comprising instructions for determining a future course of action based on the predicted classification of the outcome of the phone call.

20. The non-transitory computer-readable medium of claim 11, further comprising instructions for determining whether to schedule a follow up phone call based on the outcome of the predicted classification of the outcome of the phone call; and scheduling a follow up phone call using a scheduling management system.

* * * * *